(12) United States Patent
Ishii et al.

(10) Patent No.: US 9,037,398 B2
(45) Date of Patent: May 19, 2015

(54) NAVIGATION SERVER AND NAVIGATION SYSTEM

(75) Inventors: Kentaro Ishii, Tokyo (JP); Koji Sengoku, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 66 days.

(21) Appl. No.: 13/259,747

(22) PCT Filed: Mar. 9, 2010

(86) PCT No.: PCT/JP2010/053866
§ 371 (c)(1),
(2), (4) Date: Sep. 23, 2011

(87) PCT Pub. No.: WO2010/110050
PCT Pub. Date: Sep. 30, 2010

(65) Prior Publication Data
US 2012/0010815 A1    Jan. 12, 2012

(30) Foreign Application Priority Data

Mar. 23, 2009    (JP) .................................. 2009-069678

(51) Int. Cl.
*G01C 21/34*    (2006.01)
*G06Q 30/00*    (2012.01)

(52) U.S. Cl.
CPC .................................. *G01C 21/3461* (2013.01)

(58) Field of Classification Search
CPC .................. G08G 1/096716; G08G 1/096775; G08G 1/096741; G08G 1/0104; G08G 1/09675; G07B 15/06
USPC ................................................. 701/410, 527
See application file for complete search history.

(56) References Cited

U.S. PATENT DOCUMENTS

2004/0119609 A1*    6/2004    Solomon ....................... 340/928

FOREIGN PATENT DOCUMENTS

| JP | 2003-148986 | 5/2003 |
|----|-------------|--------|
| JP | 2006-302205 | 11/2006 |
| JP | 2007-3372 | 1/2007 |
| JP | 2007-101302 | 4/2007 |
| JP | 2007-127432 | 5/2007 |

OTHER PUBLICATIONS

International Search Report for Application No. PCT/JP2010-053866, dated Jun. 15, 2010.

* cited by examiner

*Primary Examiner* — John Q Nguyen
*Assistant Examiner* — Kyung Kim
(74) *Attorney, Agent, or Firm* — Nelson Mullins Riley & Scarborough LLP; Anthony A. Laurentano

(57) ABSTRACT

A navigation server is equipped with a support route searching element which searches for a support route from a departure position to a destination position, on the basis of a journey plan and a support map information of a support map information database, a support information retrieving element which retrieves discount information satisfying discount conditions of a toll of toll roads, on the basis of the departure time of the mobile body and the support route, and a support data creating element which transmits discount notice data which is capable of making the car navigation system output the discount information while omitting information arithmetic processing using navigation map information to the car navigation system.

3 Claims, 3 Drawing Sheets

NAVIGATION SERVER AND NAVIGATION SYSTEM

RELATED APPLICATIONS

This application is a 35 U.S.C. 371 national stage filing of International Application No. PCT/JP2010/053866, filed Mar. 9, 2010, which claims priority to Japanese Patent Application No. 2009-069678 filed on Mar. 23, 2009 in Japan. The contents of the aforementioned applications are hereby incorporated by reference.

TECHNICAL FIELD

The present invention relates to a navigation server and the like which supports navigation of a mobile body by a navigation device, on the basis of communication with the navigation device mounted on the mobile body, and the navigation device.

DESCRIPTION OF THE RELATED ART

Conventionally, there have been proposed two systems as the system which utilizes discount information of toll roads that is represented by an ETC discount in highways.

A first system, as is indicated in Patent Document 1 identified below, transmits ETC related information preliminarily from a server to a navigation device, makes the navigation device store this information, and makes the navigation device use this information to set a route in which ETC discount is applied, when the navigation device searches for a route to a destination.

A second system, as is indicated in Patent Document 2 identified below, makes the navigation server store ETC related information, makes the navigation server extract, when a current position and a destination position of a vehicle is transmitted from the navigation device to the navigation server, ETC related information of toll roads in a region connecting the two positions or in a vicinity thereof, and downloads the extracted ETC related information to the navigation device. Thereafter, the system makes the navigation device search and set a route in which the toll of the toll road from the current position to the destination position becomes most inexpensive in view of the ETC related information.

PRIOR ART REFERENCES

Patent Documents

Patent document 1: Japanese patent application laid-open 2007-101302
Patent document 2: Japanese patent application laid-open 2006-302205

SUMMARY OF THE INVENTION

Problems to be Solved by the Invention

However, in the conventional systems, it becomes necessary to make the navigation device store the discount information of toll roads and perform reference processing of matching such discount information with map information at the navigation device side, and perform route retrieval from the current position to the destination position. This is a problem in that a processing load at the navigation device becomes large.

In view of circumstances mentioned above, the present invention aims to provide a navigation server which is capable of making a user recognize at least a part of discount information, while reducing arithmetic processing load necessary for outputting the discount information at the navigation device, and a navigation system configured from the navigation server and the navigation device.

Means for Solving the Problem

In order to solve the above-mentioned problem, the present invention provides a navigation server which provides information to a mobile body, by communicating with a navigation device mounted on the mobile body, comprising: a support information storing element which receives and stores a discount information concerning discount conditions of toll of toll roads expressed by traveling time zones and entrances and exits of the toll roads, from a predetermined information source; a support route searching element which searches for a support route from a current position or a departure position to a destination position of the mobile body, on the basis of a journey plan including the current position or the departure position and a current time or a departure time and the destination position of the mobile body, which is received from the navigation device, and a support map information read out from a predetermined storing element; a support information retrieving element which retrieves the discount information of the toll roads satisfying the discount conditions, on the basis of the current time or the departure time of the mobile body, and the support route searched by the support route searching element, from the support information storing element; and a support data transmitting element which transmits a discount notice data which is capable of making the navigation device output at least a part of the discount information retrieved by the support information retrieving element, while making the navigation device omit information arithmetic processing using a navigation map information stored in a navigation map storing unit possessed by the navigation device.

According to the navigation server of the first aspect of the invention, the discount notice data which is capable of making the navigation device output at least a part of the discount information, while making the navigation device omit the information arithmetic processing using the navigation map information stored in the navigation map storing unit possessed by the navigation device, is transmitted from the navigation server to the navigation device.

The information arithmetic processing using the navigation map information includes information arithmetic processing such as reading, retrieving, writing processing of the navigation map information and the like, and a series of processing associated thereto. More specifically, the information arithmetic processing using the navigation map information includes a route retrieving processing using the navigation map information, a processing of recognizing the position of toll roads and entrances and exits and the like of the toll roads contained in the navigation map information in order to specify the positions thereof existing on the route, a processing of retrieving establishments and places of interest and the like using the navigation map information, and a processing of simply displaying the navigation map information as the current position or the destination position, and the like. Further, a processing of reporting the retrieval result of the route using the navigation map information to the user, and the like, are included in the processing associated with the information arithmetic processing using the navigation map information.

Further, the term "output" means to output in a manner in which a user is capable of sensing or recognizing via visual perception, auditory perception, and other five senses.

Because the navigation device is made to omit the information arithmetic processing using the navigation map information, it becomes possible to make the user recognize at least a part of the discount information while reducing the arithmetic processing load necessary for the output of the discount information at the navigation device.

In a navigation server of a second aspect of the invention, the support data transmitting element transmits to the navigation device the discount notice data which is capable of making the navigation device output information on entrances and exits of the toll roads satisfying the discount conditions and junctions that are necessary for the route, as a part of the discount information.

According to the navigation server of the second aspect of the invention, the discount notice data is capable of making the navigation device output information on the entrances and the exits of the toll roads satisfying the discount conditions and the junctions necessary for the route. Therefore, the navigation device is capable of outputting without using the navigation map information for specifying the position (coordinate values) of the entrances and the exits of the toll roads designated by the discount notice data, and it becomes possible to make the user recognize at least a part of the discount information while reducing the arithmetic processing load required for the output of the discount information at the navigation device.

A navigation system of a third aspect of the invention is configured from the navigation server according to the first aspect of the invention and the navigation device.

According to the navigation system of the third aspect of the invention, the discount notice data capable of making the navigation device output at least a part of the discount information while making the navigation device omit the information arithmetic processing using the navigation map information stored in the navigation map storing unit possessed by the navigation device, is transmitted from the navigation server to the navigation device. By doing so, the navigation device is made to omit the information arithmetic processing using the navigation map information, so that it becomes possible to make the user recognize at least a part of the discount information while reducing the arithmetic processing load required for the output of the discount information by the navigation device.

MODE FOR CARRYING OUT THE INVENTION

An embodiment according to the present invention will now be explained below with reference to the accompanying drawings.

Figure 1:
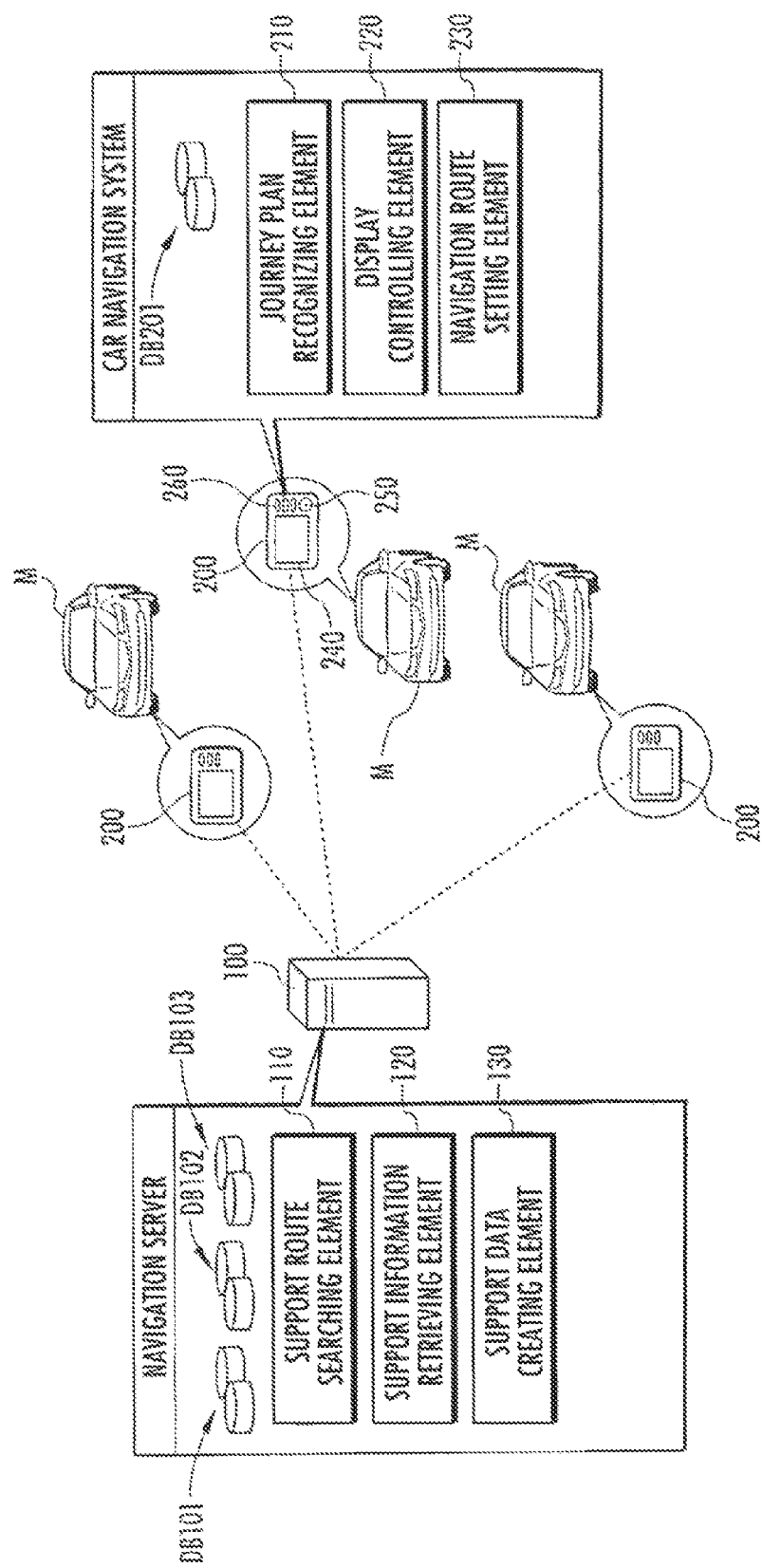
FIG. 1 is a view explaining the configuration of a navigation server and a navigation device according to an embodiment of the present invention.

First, the configuration of a navigation server 100 and a car navigation system (navigation device) 200 mounted on a mobile body will be described below with reference to FIG. 1.

The navigation server 100 comprises a support map information database 101, a support information database 102, a server database 103, a support route searching element 110, a support information retrieving element 120, and a support data creating element 130. Here, each processing unit is configured from hardware such as a CPU, a ROM, a RAM and the like, and each processing unit may be configured from a common hardware, or a part of or all of the processing elements may be configured from different hardware.

The support map information database 101 stores map information. Further, the map information of the support map information database 101 is periodically updated in accordance with the opening of a new road and the like, and is maintained to the latest map information.

The support information database 102 stores discount information concerning discount conditions for toll of toll roads, which is expressed by traveling time zones and entrances and exits (including junctions according to need) of the toll roads. The discount information of the support information database 102 is maintained to the latest discount information of the toll roads, for example, by obtaining contents of the latest ETC discount from major road companies.

Here, the discount information includes, as the discount conditions, time of passage of a tollgate to be discounted, discount time zone (date to be discounted, day of the week to be discounted), traveling distance to be discounted, section to be discounted, type of vehicle to be discounted, and the like, and as the toll of the toll road, discount rate with respect to regular fee, discount amount and the like.

The server database 103 stores information concerning the car navigation system 200 of the mobile body M. Specifically, in addition to an identification information and a version information of the car navigation system 200, the server database 103 stores a journey plan including a current position or a departure position, a destination position, and a current time or a departure time of the mobile body M transmitted from the car navigation system 200 to the navigation server 100.

The map information stored in the support map information database 101 and the discount information stored in the support information database 102 includes information that are transmitted from external computers (not shown) as information sources, to the navigation server 100 via networks such as the internet.

The support route searching element 110 searches for a support route from the current position or the departure position to the destination position that are defined by the journey plan of the mobile body M transmitted from the car navigation system 200 of the mobile body M to the navigation server 100, on the basis of the map information stored in the support map information database 101. In searching for the support route, the support route may be searched for taking into consideration road traffic information such as VICS information obtained from the information source.

The support information retrieving element 120 retrieves the discount information that satisfies the discount conditions from the discount information stored in the support information database 102, on the basis of the current time or the departure time of the mobile body, with respect to the support route searched for by the support route searching element 110.

The support data creating element 130 creates, from contents of the discount information satisfying the discount conditions that are retrieved by the support information retrieving element 120, a discount notice data capable of making the car navigation system 200 output contents thereof, while making the car navigation system 200 omit information arithmetic processing using a navigation map information possessed by the navigation device, and transmits the same to the car navigation system 200.

Specifically, the discount notice data of the present embodiment is a text file indicating the discount information on (1) name of the discount, (2) name of each of the entrances and the exits (including the junctions according to need) of the toll roads satisfying the discount conditions, (3) time of passage of each of the entrances and the exits (and the junctions) satisfying the discount conditions, and (4) discount amount (discount rate) with respect to the regular fee, by characters or by character codes.

Here, the discount information transmitted by the discount notice data may include at least (2) the name of each of the entrances and the exits (the junctions) of the toll roads satisfying the discount conditions, and may be combined with a part of or all of the information (1), (3) and (4) described above.

Further, the discount notice data is not limited to the text file, and may be in formats other than the text file, as long as it is a file (data) format in which the content of the discount information is expressed in characters or character codes.

On the other hand, the car navigation system 200 of the mobile body M is equipped with a navigation map information database 201, a journey plan recognizing element 210, a display controlling element 220, a navigation route setting element 230, a liquid crystal panel 240 which displays the arithmetic processing result of these elements via images, a loudspeaker 250 which announces the processing result via sound, and operation buttons 260 which enables a user to perform inputs and operations.

The navigation map information database 201 stores map information (navigation map information). Here, it is preferable that the map information of the navigation map information database 201 coincides with the map information of the support map information database 101. However, even in the case where the two does not coincide, the navigation map information database 201 is capable of using the discount information in toll roads to be explained later.

The journey plan recognizing element 210 recognizes the journey plan including the current position of the mobile body M, using a GPS of the mobile body M, or the departure position input by the user via the operation buttons 260, and the destination position.

Further, in the case where the user particularly designates the departure time via the operation buttons 260 of the car navigation system 200, the journey plan recognizing element 210 recognizes the designated departure time as the journey plan, in addition to the current time of the mobile body M.

Here, in the case where the liquid crystal panel 240 is a touch panel, the journey plan recognizing element 210 recognizes the journey plan from the input on the basis of the touch operation to the liquid crystal panel 240 by the user.

Here, the term a component of the present invention "recognizes" information means that the component performs all possible information processing necessary for preparing or providing information for further information processing, such as the component searches the piece of information in an database; retrieves the piece of information from a storage device such as a memory or the like; measures, calculates, estimates, determines the piece of information or the like on the basis of the output signals from sensors or the like; and stores in memory the piece of measured information or the like.

The display controlling element 220 controls display of the content of the text file transmitted from the navigation server to the liquid crystal panel 240, and also controls display of the position of the mobile body M, a route from the current position or the departure position to a destination or a predicted traffic information of the route and the like to the liquid crystal panel 240.

The navigation route setting element 230 sets the navigation route from the current position or the departure position to the destination position taking into consideration the discount information, on the basis of the navigation map information of the navigation map information database 201, the journey plan recognized by the journey plan recognizing element 210, and the discount information from the discount notice data transmitted from the navigation server.

The functions of the navigation server 100 and the car navigation system 200 of the above-mentioned configuration will be explained with reference to FIG. 2.

Figure 2:
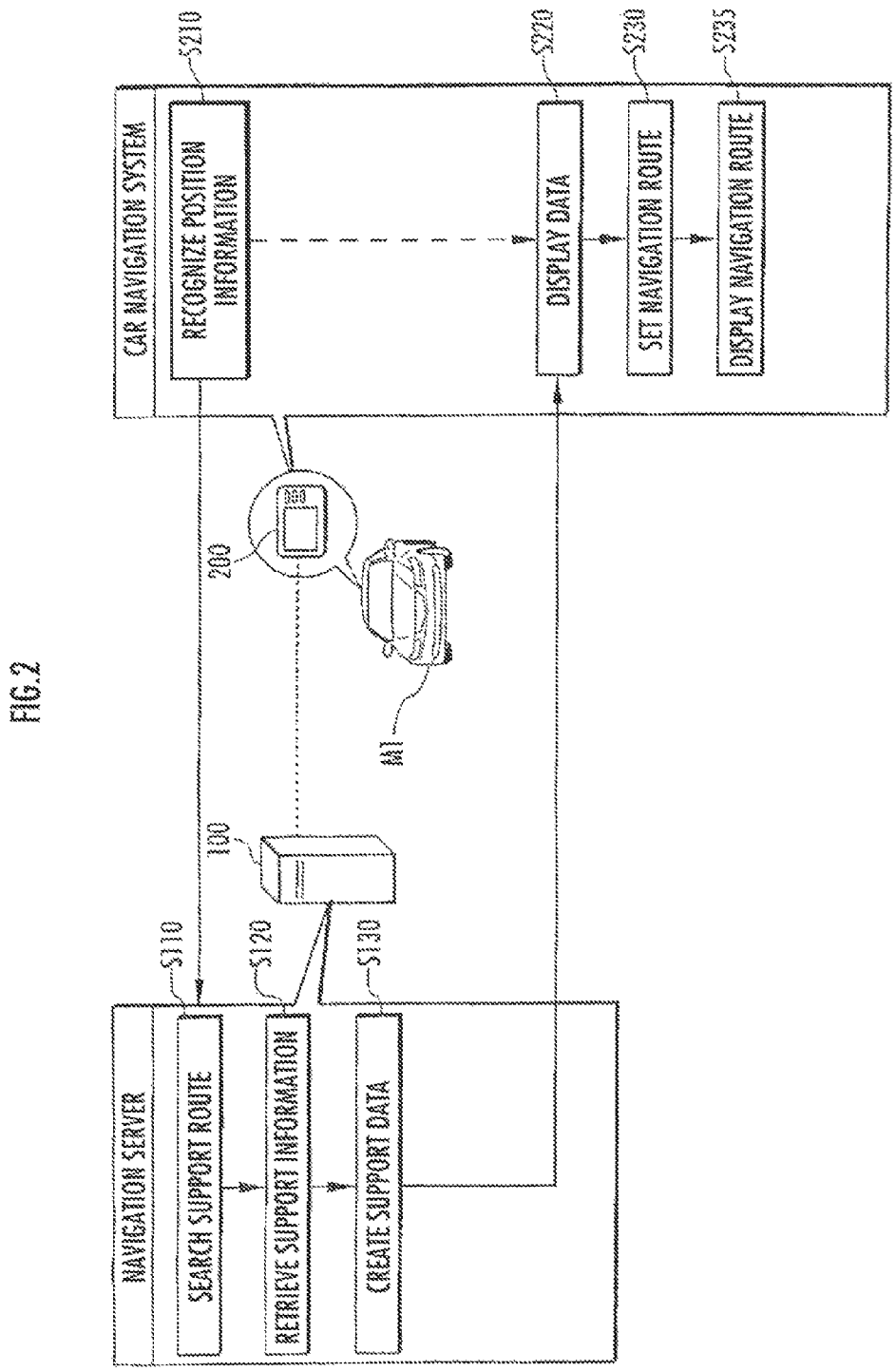
FIG. 2 is a view explaining the processing of the navigation server and navigation device in FIG. 1.

First, as is shown in FIG. 2, the journey plan recognizing element 210 of the car navigation system 200 of the mobile body M recognizes the journey plan including the current position or the departure position, the destination position, and the current time or the departure time of the mobile body M, at a timing when the user sets the destination position via the operation buttons 260 or the like (FIG. 2/S210).

Subsequently, when a retrieval of the discount information in toll roads is selected in place of ordinary route retrieval, by the operation of the operation buttons 260 by the user, the car navigation system 200 transmits the journey plan to the navigation server 100. Thereafter, the navigation server 100 receives the journey plan transmitted from the car navigation system 200 of the mobile body M to the navigation server 100 via a network.

The car navigation system 200 may automatically transmit the journey plan to the navigation server 100, triggered by recognizing the journey plan, even when the retrieval of the discount information in the toll roads is not selected.

Next, the support route searching element 110 of the navigation server 100 searches for one or a plurality of support routes connecting the current position or the departure position and the destination position, on the basis of the map information stored in the support map information database 101 (FIG. 2/S110).

Subsequently, the support information retrieving element 120 of the navigation server 100 retrieves the discount information concerning the discount conditions of the toll of the toll roads, which is expressed by the traveling time zone and the entrances and the exits (the junctions) of the toll roads, with respect to the support routes searched by the support route searching element 110, on the basis of the discount information stored in the support information database 102 (FIG. 2/S120).

For example, the support information retrieving element 120 specifies, after extracting the toll road sections existing on the support route, the entrances for entering the section (the tollbooths and ETC car exclusive tollbooths (ETC exclusive gateways)), and the exits existing in the sections after the entrances (the tollbooths and ETC car exclusive tollbooths (ETC exclusive gateways), and retrieves the discount information satisfying the discount conditions of the traveling distance to be discounted and the sections to be discounted. The sections to be discounted may be all of or a part of the toll road sections on the support route. Further, the mobile body may depart from the toll road once and thereafter enter another section of the toll road again from adjacent entrance.

Further, the support information retrieving element 120 retrieves the discount information satisfying the discount conditions of the time of passage of the tollgate to be discounted, and the discount time zone, from the time of passage of the entrance and the time of passage of the exit (the time of passage of the junction) of each of the entrances and the exits (includes junctions according to need) that are predicted from the current time or the departure time.

Thereafter, in the case where the discount information satisfying the discount conditions mentioned above exists, the support information retrieving element 120 outputs the retrieval result including the information on (1) the name of the discount, (2) the name of each of the entrances and the exits (the junctions) of the toll roads satisfying the discount conditions, (3) the time of passage of each of the entrances and the exits (and the junctions) satisfying the discount conditions, and (4) the discount amount (discount rate) with respect to the regular fee, to the support data creating element 130.

Next, the support data creating element 130 of the navigation server 100 creates the discount notice data comprising the text file in which the information on (1) through (4) mentioned above retrieved by the support information retrieving element 120 is expressed in characters or character codes, and transmits the same to the car navigation system 200 (FIG. 2/S130).

The car navigation system 200 having received the discount notice data from the navigation server 100 displays the contents of the discount information by the discount notice data on the liquid crystal panel 240 via the display controlling element 220 (FIG. 2/S220).

Because the discount notice data is in a text file format in which (1) through (4) mentioned above are configured from character information, and does not include coordinate information of the entrance and exit of the toll road and the like, it becomes possible to display the content of the discount information by the discount notice data as it is as the character information on the liquid crystal panel 240, while eliminating the need for a reference processing with the map information of the navigation map information database 201 of the car navigation system 200 (information arithmetic processing using the navigation map information).

Figure 3:
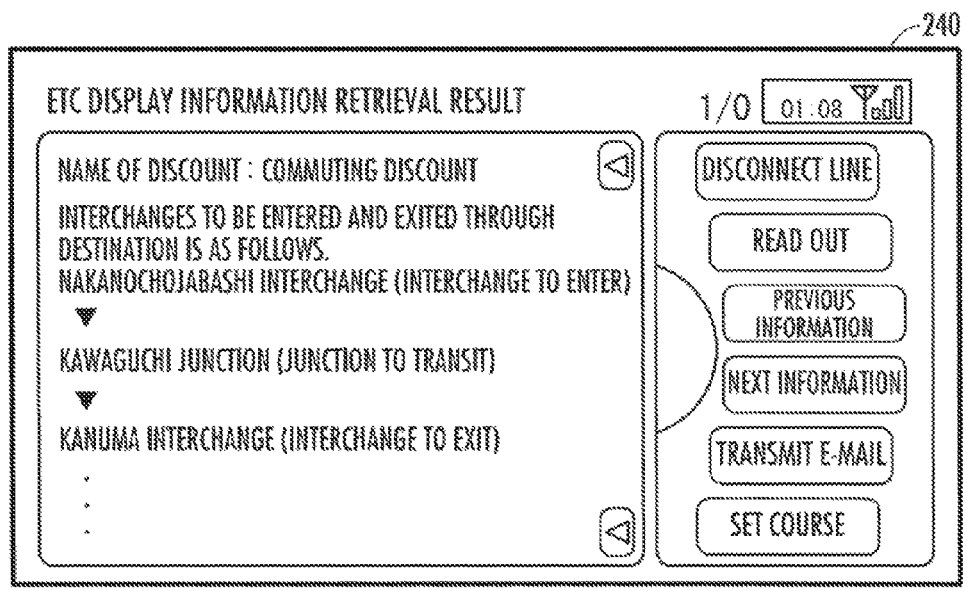
FIG. 3 is a view explaining an example of discount information displayed on a liquid crystal panel.

As shown in FIG. 3, specifically, messages shown below are displayed on the liquid crystal panel 240. That is, (1) "commute discount" as the name of the discount is displayed, and therebelow (2) "Nakano Chojabashi Interchange" (entrance), "Kawaguchi Junction" (junction), "Kanuma Interchange" (exit), "Utsunomiya Interchange" (entrance), and "Sukagawa Interchange" (exit) as the names of the entrances and the exits (the junctions) of the toll roads satisfying the discount conditions are displayed in the order of traveling of the support route.

Further, (3) the discount condition of "pass Kawaguchi Junction (pass) and Kanuma Interchange (exit) between 6 through 9 a.m.", "pass interchanges of Utsunomiya Interchange (enter) and Sukagawa Interchange (exit) between 6 through 9 a.m." as the time of passage of the entrances and the exits (the junctions) for satisfying the conditions (the time of passage of the tollgates to be discounted) of the commute discount is displayed, and (4) the discount amount of 1,650 JPY with respect to the regular fee (5,500 JPY) in this case is displayed.

The discount information by the discount notice data may be displayed as it is without processing the discount notice data transmitted from the navigation server 100 at all, as is shown in FIG. 3, but may also be displayed while editing the entrances and the exits (the junctions) of the toll roads. For example, from the current position, the entrances and the exits (the junctions) and the destination position may be displayed taking the lower side to the upper side of the liquid crystal panel 240 as the traveling direction. In contrast thereto, these pieces of information may be displayed from the upper side to the lower side of the liquid crystal panel 240.

Next, when a course setting using the contents of the discount information of the discount notice data is selected by the operation of the operation buttons 260 by the user, the navigation route setting element 230 retrieve and sets the navigation route from the current position or the departure position to the destination position, setting the names of each of the entrances and the exits (the junctions) of the toll roads satisfying the discount conditions as transit point name (FIG. 2/S230).

Because the discount notice data transmitted from the navigation server 100 is in the text file format, and the format is in a file format capable of recognizing a transit point information, the navigation route setting element 230 is capable of recognizing the names of each of the entrances and the exits (the junctions) of the toll roads designated by the discount information of the discount notice data as it is as the transit point information, and is capable of performing retrieval setting these points as the transit points.

The processing load of the retrieval and setting of such navigation route is similar to that for the route setting carried out regularly. Therefore, it becomes possible to set the navigation route satisfying the discount conditions simply and surely, and also becomes possible to use the application software of the car navigation system 200 for setting the transit points without the need for changing the application software therefor.

The navigation route set as explained above is displayed on the liquid crystal panel 240 via the display controlling element 220 (FIG. 2/S235).

As is explained in detail above, according to the navigation server 100 and the car navigation system 200 of the present embodiment, it becomes possible to use the discount information of the toll roads in the car navigation system 200, without bearing processing load on the car navigation system 200.

In the present embodiment, the display of the discount information by the discount notice data on the discount information (FIG. 2/S220) is carried out. However, in addition to or in place of such display, it may be configured to make the user recognize the contents of the discount information acoustically by reading out the content of the discount information via the loudspeaker 250. Further, in addition to or in place of such display, it may be configured to transmit the content of the discount information to an e-mail address set beforehand.

Further, in the present embodiment, in the case where the normal route retrieval is selected by the operation of the operation buttons 260 by the user (in the case where retrieval of the discount information in the toll roads is not selected), it may be possible to set the navigation route on the basis of the travel plan, without transmitting the travel plan from the car navigation system 200 to the navigation server 100, as is indicated by a broken line in FIG. 2.

Further, in the present embodiment, in the case where the map information of the navigation map information database 201 and the map information of the support map information database 101 does not coincide, the car navigation system 200 may not retrieve and set the navigation route using the discount information, and may display such fact on the liquid crystal panel 240. In this case, it is preferable to set a flag for determining use of the transit point information in the file format of the discount notice data and the like, and to determine whether or not the retrieval and setting of the navigation route is possible from a map version of the navigation map information database 201. By doing so, it becomes possible to avoid the situation where the navigation route different from the support route is set, in the case where the navigation map information is not corresponding to the latest toll roads and the like.

Still further, in the present embodiment, in the case where the user desires to research the route in view of a positional relationship between the position of the navigation route and the names, the navigation route setting element 230 may perform rerouting on the basis of the navigation map information, or the navigation route setting element 230 may set rerouting on the basis of the information on the support route acquired from the navigation server 100, which is searched by the support route searching element 110 of the navigation server 100 (at least including a coordinate information of the entrances and the exits (the junctions) satisfying the discount conditions).

The invention claimed is:

1. A navigation server which provides information to a mobile body, by communicating with a navigation device that is configured to set a navigation route from a current position or a departure position to a destination position of the mobile body and is mounted on the mobile body, comprising:

a support information storing element which receives and stores a discount information concerning discount conditions of tolls of toll roads expressed by traveling time zones and entrances and exits of the toll roads, from a predetermined information source;

a support route searching element which searches for a support route from the current position or the departure position to the destination position of the mobile body, on the basis of a journey plan including the current position or the departure position and a current time or a departure time and the destination position of the mobile body, which is received from the navigation device, and a support map information read out from a predetermined storing element;

a support information retrieving element which retrieves the discount information of the toll roads satisfying the discount conditions, on the basis of the current time or the departure time of the mobile body, and the support route searched by the support route searching element, from the support information storing element; and a support data transmitting element which transmits a discount notice data that is distinct from navigation information transmitted to the navigation device and is represented in text form comprising one or more entrances and exits of toll roads satisfying the discount conditions and junctions for the support route, which is capable of making the navigation device output at least a part of the discount information retrieved by the support information retrieving element, wherein the navigation device recognizes that a receipt of data in the text form does not trigger information arithmetic processing using a navigation map information stored in a navigation map storing unit possessed by the navigation device;

wherein names of each of the entrances and the exits of the toll roads designated by the discount information of the discount notice data are capable of being recognized by the navigation device as transit point information.

2. The navigation server according to claim 1, wherein the support data transmitting element transmits to the navigation device the discount notice data which is capable of making the navigation device output information on entrances and exits of the toll roads satisfying the discount conditions and junctions that are necessary for the route, as a part of the discount information.

3. A navigation system configured from the navigation server according to claim 1 and the navigation device.

* * * * *